(No Model.)
J. C. WILSON, Sr.
FLEXIBLE SHAFT.
No. 322,666. Patented July 21, 1885.
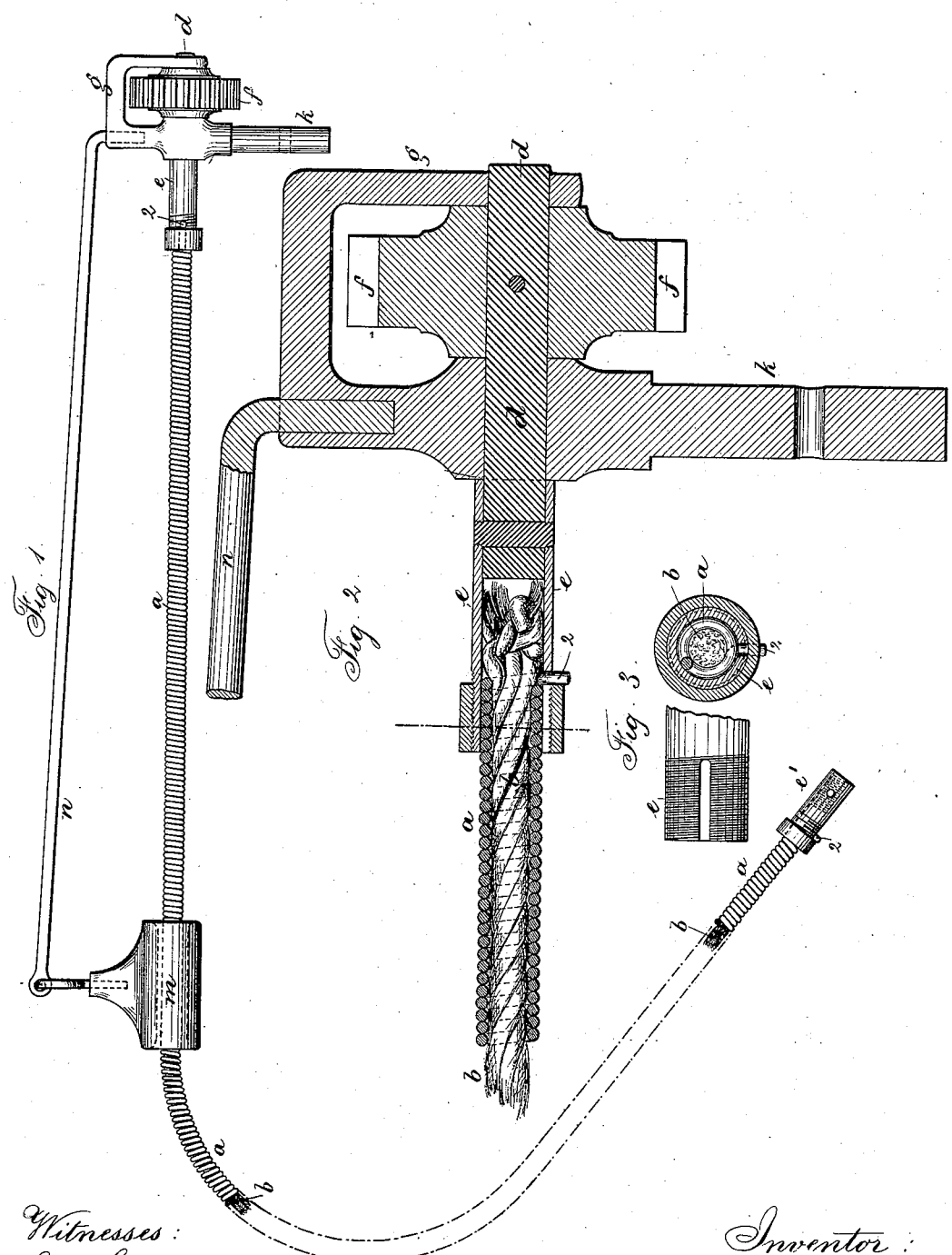
Witnesses:
J. Staib
Chas. H. Smith
Inventor:
John C. Wilson Sr.
per Lemuel W. Serrell
Atty.

UNITED STATES PATENT OFFICE.

JOHN C. WILSON, SR., OF NEW YORK, N. Y., ASSIGNOR TO FRANCIS T. LUQUEER, JR., AND JOHN C. WILSON, JR., OF SAME PLACE.

FLEXIBLE SHAFT.

SPECIFICATION forming part of Letters Patent No. 322,666, dated July 21, 1885.

Application filed December 27, 1884. (No model.)

*To all whom it may concern:*

Be it known that I, JOHN C. WILSON, Sr., of the city and State of New York, have invented an Improvement in Flexible Shafts for Horse-Clipping Machines, Drilling-Tools, &c., of which the following is a specification.

Flexible shafts have been made of wires braided together or crossing each other, and contained within a flexible case; but they are expensive, and there is friction and wear upon such case.

My present improvement is made for simplifying the construction of the flexible shaft and for rendering durable the connection between the flexible portion of the shaft and the rigid end portions.

In the drawings, Figure 1 is an elevation illustrating the flexible shaft and the support at one end. Fig. 2 is a section at the driving end of the shaft in larger size, and Fig. 3 is a side view and cross-section of the slotted socket for the helix.

The flexible shaft is made of a steel-wire helix, $a$, closely wound, and of a size to furnish the required strength. The ends of the wire are bent outwardly, as at 2. Within this helix there is a rope, $b$, of hard twisted hemp or similar material, and this rope is drawn into the helix, and fills the same tightly, and there is a knot or rigid fastening at each end. This rope prevents the helix being stretched endwise, as it may be moved in carrying the shear or drill from place to place; and hence the helix is not liable to become coiled or injured in use, but it yields to the ordinary curves or flexures necessary in directing the tool that is driven by such shaft to the place of use. The flexible shaft is attached to the revolving motor-shaft $d$ by the tubular socket $e$. This is provided with a screw-thread upon its outer surface around the end portion, and there is a slot cut into the tube at one side. The socket is adapted to receive into it the end of the helix, and the projecting wire 2 is entered in the slot. The screw-thimble is passed over the end of the helix before the latter is entered into the socket. After this the thimble is screwed upon the end of the socket to contract the same and clamp the helix, and also to hold the end of the wire firmly in the inner end of the slot.

The socket $e'$ for the tool-holder is formed in the same manner as the socket $e$.

I have shown a pinion, $f$, upon the motor-shaft $d$, and also the frame $g$ for holding the shaft. This frame generally is supported by the pintle or pivot $k$ that passes into a stationary socket. This allows the parts to be swung around horizontally, so that the flexible shaft may be in any desired direction.

The yielding bearing $m$ is preferably made of a block of wood with a hole in it, through which the flexible shaft passes freely. This bearing is at the end of a yielding arm, $n$, supported at the other end by the frame $g$. The object of this bearing is to prevent the flexible shaft being injured at its junction with the rigid shaft in consequence of the leverage in moving the tool.

The bearing $m$ causes the flexible shaft to bend at some little distance from the rigid shaft.

I claim as my invention—

1. The flexible shaft for machinery formed of a wire helix closely wound, and the rope within and filling such helix and knotted at the ends to prevent the helix stretching, and tubular sockets receiving the ends of the helix and the knots of the rope, substantially as set forth.

2. The flexible shaft formed of a closely-wound wire helix, a rope within the same, and the ends of the wire bent outwardly, in combination with the tubular socket slotted for the reception of the wire end, and the clamping-nut screwed upon the socket, substantially as set forth.

3. The combination, with the flexible shaft, of the socket for receiving the end of such shaft, the rigid motor-shaft, its supporting-frame, the spring arm, and the yielding bearing $m$ at the end of the arm, substantially as set forth.

Signed by me this 23d day of December, A. D. 1884.

JOHN C. WILSON, SR.

Witnesses:
GEO. T. PINCKNEY,
WILLIAM G. MOTT.